Feb. 4, 1958 D. A. GUSTAFSON 2,821,902
CONTROL FOR MOTOR-OPERATED TOASTER
Filed March 23, 1954 2 Sheets-Sheet 1
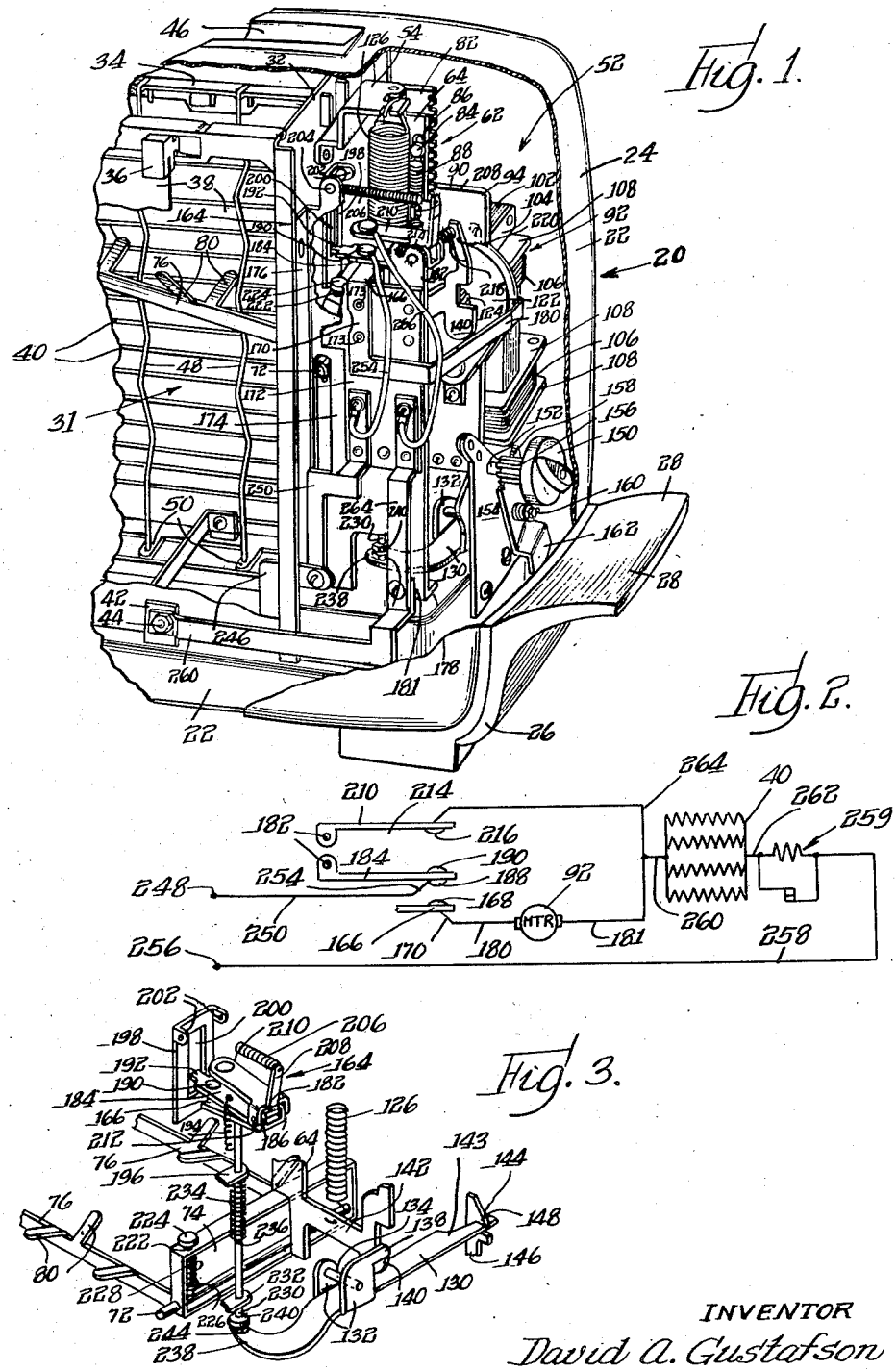
INVENTOR
David A. Gustafson
By: Karl H. Sommermeyer
atty.

Feb. 4, 1958 D. A. GUSTAFSON 2,821,902
CONTROL FOR MOTOR-OPERATED TOASTER
Filed March 23, 1954 2 Sheets-Sheet 2

INVENTOR.
David A. Gustafson
By: Karl H. Sommermeyer
Atty.

United States Patent Office 2,821,902
Patented Feb. 4, 1958

2,821,902
CONTROL FOR MOTOR-OPERATED TOASTER

David A. Gustafson, Elgin, Ill., assignor to McGraw-Edison Company, a corporation of Delaware Application March 23, 1954, Serial No. 418,177

6 Claims. (Cl. 99—329)

This invention is concerned with a toaster, and more particularly with a control for a motor-operated toaster.

In electrically heated toasters, it is standard practice to connect the heating elements directly across the power line. The heating elements often are relatively cold when this is done, and thus have their lowest resistance. The suddden application of the entire line voltage across the heating elements, particularly when the heating elements are cold and have low resistance, causes the temperature of the heating elements to change at a very rapid rate. The extremely rapid heating brought about in this manner is accompanied by an equally rapid change in dimensions, and the rapid change in temperature and dimensions tends to shorten the useful life of the heating elements to a significant extent.

If the voltage and current applied to the heating elements could be increased gradually, or in steps, the life of the heating elements could be materially prolonged. For a sudden change of energization (as when closing a switch) the temperature rises approximately on a logarithmic decay curve of the shape $(1-e^{-kt})$. Therefore, the maximum rate of temperature rise in any step is roughly proportional to the size of the step in watts.

In prior toasters it has not been feasible to introduce any extra apparatus such as a resistor and switch for preheating the heating elements, as this would substantially increase the cost of the toaster and would make it more complicated and more difficult to produce, and would make it more prone to operational disorders.

It is an object of this invention to provide a preheating step in a toaster without the disadvantages above noted.

More specifically, it is an object of this invention to provide a preheating step in an automatic toaster without the necessity of providing additional parts in the toaster.

In the most advanced automatic toasters, it is unnecessary for the person using the toaster to exert any manual effort such as for lowering a toast carrying mechanism. All that is necessary is to drop slices of bread in the toaster. Such slices of bread act through an appropriate mechanism to close a switch to cause a small motor to lower the toast carrying mechanism. The toast carrying mechanism is raised to its original position by suitable spring means at the end of a toasting operation.

It is an object of this invention to provide a motor operated toaster wherein the motor and timer are operated in series with the heating elements to reduce the initial energization of the heating elements.

It is a further object of this invention to provide a motor operated toaster of the foregoing character wherein the maximum rates of temperature rise of the heating elements when in series with the motor and following the operation of the motor when the motor is out of the circuit are approximately equal.

Other and further objects and advantages of the present invention will be apparent from the following description when taken in connection with the accompanying drawings wherein:

Fig. 1 is a fragmentary perspective view of a toaster embodying the principles of the invention with part of the casing or shell being broken away for clarity of illustration;

Fig. 2 is a wiring diagram schematically illustrating the principles of the invention;

Fig. 3 is a perspective view of the switching mechanism; and

Figure 4:
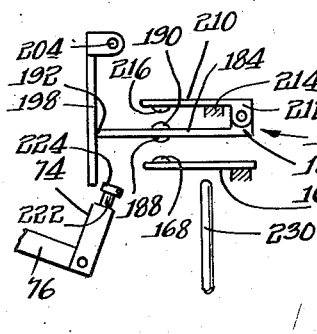
Figs. 4–10 are similar fragmentary views showing the sequence of operation of the switching mechanism.

Referring now in greater particularity to the figures, and first to Fig. 1, there will be seen a toaster 20 including the usual frame 22 to which a housing, casing, or shell 24 is secured by any suitable means such as sheet metal screws (not shown). Thermal insulating end pieces 26, such as molded plastic, are secured to the casing by any suitable means and include handles 28 for lifting the toaster. Rubber or other resilient, non-marring feet (not shown) preferably are mounted beneath the thermal end pieces 26 for supporting the toaster on the table or the like.

The toaster is provided with toasting ovens 31 including a pair of spaced apart end plates 32 (only one being shown) extending upwardly from the frame 20 to which they are secured by any known or suitable means. Four angle bars 34 extend between the end pieces 32, and insulating pieces 36 made of some suitable material such as porcelain are carried by the angle bars 34 and support the top edges of mica sheets 38. The heating elements or toasting coils 40 are wound on these mica sheets, and preferably are formed of the usual flat ribbon or resistance wire commonly used for such toasting coils or heating elements. The lower edges of the mica sheets are supported from the frame 20 by means of suitable insulating pieces 42, and certain of these pieces also serve to provide insulating mounts for terminals 44 of the toaster windings or heating elements.

The mica sheets 38 are provided in the usual spaced apart pairs, and elongated slots 46 are provided in the top of the casing to allow insertion and removal of the bread into and from the toasting oven provided by the heating elements and mica sheets. Wire spacers 48 of the usual zigzag configuration extend from the angle bars 34 down to suitable tabs 50 on the lower frame suitably to space bread slices from the toasting coils 40 on the mica sheets.

Suitable operating means 52 are mounted on the right-hand end plate 32 and on the frame 22 immediately adjacent thereto. The operating means 52 includes a bracket 54 affixed to the right hand end plate 32. The bracket 54 supports the upper end of the carriage rod 56, the lower end being suitably carried by the frame 20. A spring (not shown) encircles the upper end of the rod 56, immediately beneath its mounting on the bracket 54 to provide a resilient stop or shock absorber for the carriage hereinafter to be disclosed.

A carriage 62 (see also Fig. 3) is slidably mounted on the rod 56 and includes a verticle angle piece 64 having upper and lower horizontal flanges (not shown) provided with aligned apertures and suitable bushings and bearings (not shown) which slidably mount the carriage on the rod 56.

A horizontal pivot rod 72 (Figs. 1 and 3) is suitably carried by the carriage 62 and pivotally mounts a rectangular, box-shaped bracket 74. This bracket carries a pair of bread or toast carriers 76 which are affixed thereto in any suitable manner. The two toast carriers each take the form of an elongated arm, the outermost end of which extends through a guide slot (not shown) in the left end wall 32 (not shown). Spaced lugs or ears 80 are provided on the arms and are integral therewith, extending laterally at an angle thereto, suitably to support bread slices.

A rack 82 is mounted on one side of the vertical angle member 64 of the carriage 62, and is preferably mounted thereon for limited vertical movement relative to the angle member by means of pins 84 on the rack slidably fitting through vertically elongated slots 86 in the side of the angle member. Opposed coil springs 88 are anchored to the pins and to an intermediate lug 90 on the angle member midway between the slots 86.

A motor 92 is mounted on the end plate 32 by means of a bracket 94 suitably carried from the bracket 54. The lower end of the bracket 94 is supported by means of another bracket (not shown) carried from the frame 22. The motor further is mounted by means of brackets, such as the bracket 104, secured to the horizontal portions of the motor frame 102.

In addition to the foregoing, the motor includes coil windings 106 positioned between suitable insulating pieces 108. The motor is provided with the usual poles and rotor (not shown) and the rotor acts through a gear train in a housing 122 to drive a pinion 124 meshing with the rack 82. When the motor is energized by means hereinafter to be set forth, it rotates the pinion 124 to lower the rack, and hence to lower the carriage and the toast carriers 76. The spring connecton of the rack to the carriage prevents undue shock from being imposed on the driving connections when the motor starts and when the carriage reaches fully raised and fully lowered positions.

A coil spring 126 (Figs. 1 and 3) is stretched between the bracket 54 and a part 128 on or associated with the lower part of the carriage 62. The spring normally holds the carriage in raised position, and is stretched as the carriage is lowered by the motor 92. The stretched spring serves to raise the carriage and the toast carriers at the end of a toasting operation.

Means is provided for latching the carriage in lowered position and comprises a latch bar 130 as shown in Figs. 1 and 3. The latch bar is provided with a pair of upstanding ears 132, and this pair of ears is pivotally mounted on the pin 134 between a pair of ears (not shown) upstanding from the frame 20. A finger 138 extends from the front ear 132 longitudinally of the latch bar 130 and is adapted for cooperation with a tooth 140 on the member 128 at the bottom of the carriage. The latch bar is normally biased in a counterclockwise, carriage releasing position by means of a coil spring (not shown) encircling the pin 134.

As the carriage is lowered by the motor 92, the bottom edge of the tooth 140 strikes the latch bar 130 to pivot the latch bar in a clockwise direction. This causes the finger 138 to pivot into position above the tooth 140 to hold the carriage in lowered position against the action of the spring 126. The extending end 143 of the latch bar engages the bevelled upper edge 144 of a holding detent 146 and cams the detent aside until the extending end of the latch bar has passed the tooth 148 of the detent. The detent is spring urged into the position shown, and the spring biasing of the detent returns it to its normal position so that the tooth 148 engages above the extending end 143 of the latch bar to hold it in the position shown in Fig. 3 with the carriage latched in lowered position.

The detent 146 is controlled by a timing mechanism (not shown) of any conventional construction, such as a thermal timing mechanism. After a predetermined toasting interval, the timing mechanism acts to withdraw the detent 146 to release the extending end 143 of the latch bar 130. The spring about the pivot of the latch bar (not shown) and the upward force exerted on the finger 138 of the latch bar by the tooth 140 of the carriage rotate the latch bar in a counterclockwise direction to release the carriage which is then raised by the spring 126.

The toasting interval may be varied to produce light or dark toast by rotating a knob 150 (Fig. 1) positioned externally of the toaster housing 24. This knob is fixed on a shaft 152 rotatably mounted on a plate 154 upstanding from the frame 22. An axially elongated pinion 156 is mounted on the shaft and rotates with the knob 150. The pinion meshes with a gear segment 158 on a control lever pivotally mounted on a plate 154 at 160. The opposite end of the lever is provided with a skewed tip 162 forming a cam engaging a suitable member (not shown) linked to the timing mechanism to render the timing mechanism operative to withdraw the detent after any preselected interval to release the carriage for raising the toast. The shaft 152 is axially slidable and is adapted, in response to axial pressure on the knob 150, to engage a suitable member (not shown) for manually retracting the detent 146 to effect raising of the carriage at any time.

The toaster parts heretofore disclosed are not new with this application. The invention resides in the switching mechanism hereinafter to be disclosed and in the manner in which the previously disclosed parts operate by this switching mechanism. The switch mechanism is shown physically in Figs. 1 and 3, schematically in Fig. 2, and diagrammatically in Figs. 4–10. The switch mechanism is identified generally by the numeral 164. The switch mechanism 164 comprises a first contact carrying blade 166 having a contact button 168 thereon. The contact carrying blade continues as a right angularly disposed strip 170 which is riveted or otherwise permanently secured to an insulating plate 172 as at 173. The insulating plate is riveted or otherwise permanently mounted on a vertically disposed mounting plate 174, and this mounting plate has a right angularly disposed flange 176 secured to the right-hand end plate 32, and a foot 178 secured to the frame 22. Suitable apertures are provided in the mounting plate 174 to provide clearance for the rivets or other fasteners 173, and for other fasteners as hereinafter will be apparent.

The strip 170 continues as a horizontal or offset strip 180 to the windings of the motor 92. A strip 264 is secured at its lower end to a contact returning from the motor windings, and also to the offset tip of an L-shaped strip 260 leading to the terminal 44 of the toasting oven or heating coils.

A pivot pin 182 extends transversely from the upper edge of the mounting plate 174, and a double throw switch blade 184 is pivotally mounted on this pin by means of a pair of apertured, upstanding ears 186. The blade 184 carries a lower contact 188 cooperable with the contact 168, and also carries an upper contact 190, it being understood that these contacts are connected to one another and are insulated from the arm 184. The free end of the blade 184 is provided with a tongue 192 of reduced width. A spring 194 is stretched between the blade 184 and a laterally extending ear (not shown) on the mounting plate for urging the blade downwardly.

Downward movement of the blade 184 is resisted by a retainer 198 having a central slot 200 elongated in a vertical plane and receiving the tongue 192 of the blade 184. The slot is sufficiently wide to receive the tongue 192, but not to receive the remainder of the blade 184. The retainer 198 is pivotally mounted by means of a pair of ears 202 apertured to receive a pin 204 extending transversely from the top of the mounting plate 174. A spring 206 is stretched between the retainer 198 (shortly below the pivot thereof) and an upstanding tail 208 shortly to be described. This spring normally maintains the retainer 198 biased against the shoulders of the blade 184 where the blade is reduced in width to form the tongue 192.

An upper contact carrying blade 210 is pivotally mounted on the pin 182 along with the blade 184 by means of a pair of ears 212 embracing the ears 186. The tail 208 previously mentioned is formed integral with the blade 210, and the top blade 210 is urged toward the intermediate blade 184 by the aforementioned spring 206. Downward movement of the blade 210 is limited by a mechanical stop in a form of a finger 214 projecting at right angles from the top of the mounting plate 174. The upper blade 210 is provided on its under surface with a contact button 216 aligned with the button 190 on the intermediate blade, and designed to contact the button 190 when the intermediate blade is in its raised position.

A spring 218 is stretched between the top of the box-shaped bracket 74 and an upstanding tail 220 on the carriage 62. This spring normally tilts the box-shaped bracket 74 and the accompanying bread or toast carriers 76 to the position shown in Figs. 1, 4, and 10.

A plunger 222 (Figs. 1 and 3) having an enlarged head 224 is mounted for axial movement in aligned apertures in the top edge of the bracket 74 and in an ear 226. The plunger is spring urged upwardly by a coil spring 228 compressed between the ear 226 and a clip or other projection (not shown) on the plunger beneath the upper edge of the bracket 74. With the bracket 74 and carriers 76 tilted to the position shown in Figs. 1, 4, and 10, the head 224 of the plunger is displaced slightly from the retainer 198. When the carriers and box-shaped bracket are pivoted by the weight of the slice of bread to bring the carriers into horizontal position, the head 224 engages the retainer 198 to pivot the retainer away from the tongue 192 of the intermediate blade 184 to allow the blade to be pulled down by the spring 194.

A slide rod 230 is mounted vertically for reciprocation in aligned apertures in an ear 196 on the mounting plate 174, and in another ear 232 extending from the plate 174 near the bottom thereof. The rod is positioned beneath a part of the intermediate blade 184 for engaging the blade 184 while clearing the fixed blade 166. A coil spring 234 encircles the rod and is trapped between the ear 196 and a wire clip 236 fitting in an annular groove in the rod for urging the rod downwardly.

The end of the latch arm 130 opposite the end 143 and hereinafter identified by the number 238 is positioned beneath the rod 230 and is provided with a stop in the form of an enlarged head 240 on a bolt (not shown) threaded into the end 238 of the latch bar 130. A jam nut 244 on the bolt locks the bolt in adjusted position.

When the latch bar 130 is pivoted in a clockwise direction as a result of engagement of the finger 138 thereon by the carriage, the rod 230 is raised against the force of the spring 234 to engage and raise the central blade 184 as will be pointed out in greater particularity hereafter.

A strap-like conductor 246 leads from one of the input connections 248 of the toaster to a bracket 250 mounted on the insulating plate 172, a suitable aperture being provided in the mounting plate 174 to provide clearance for the connections mounting the bracket 250. A flexible lead 254 extends from the bracket 250 to the upper contact 190 on the intermediate blade 184, the two contacts 188 and 190 on this blade being electrically connected together and insulated from the blade 184 by any suitable or convenient means (not shown).

The other input connection 256 to the toaster is connected by a conductor 258 to a timer 259 indicated schematically in Fig. 2 as a double acting thermal timer of known design. The timer is not shown physically as previously has been indicated, but preferably is located within the housing 24 below the motor 92, and preferably immediately below the detent 146. The timer is connected by a conductor indicated schematically in Fig. 2 at 262 to the heating or toasting coils 40 of the oven. It will be apparent from the showing in Fig. 2 that there preferably are four toasting coils connected in parallel, and that the wire 262 is connected to the coils or heating elements at the opposite common end thereof from the conductor 260. The strap or conductor 264 previously indicated as connected to the motor lead 181 and the strap 260 is suitably mounted on the insulating plate 172 (the necessary apertures to insulate the mounting means being provided in the mounting plate 174), and the upper end of the strap 264 is connected by means of a flexible wire 266 to the contact 216 on the upper blade 210, the contact being insulated from the blade by any suitable or desirable means.

Operation

Figure 10:
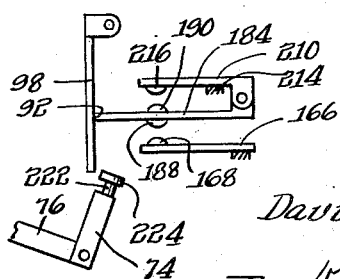

Before the start of a toasting operation, parts of the toaster are in the positions shown in Figs. 1, 4, and 10. At this time the toast carriers 76 are inclined upwardly, and the intermediate blade 184 of the switch mechanism 164 is in a horizontal position with the tongue 192 fitting in the slot 200 and supported by the retainer 198.

Figure 5:
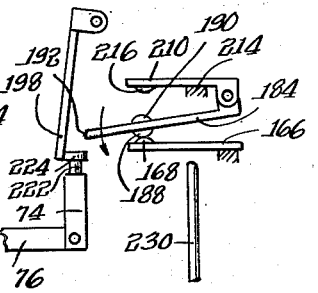

When a slice of bread to be toasted is dropped through one of the slots 46 upon the corresponding toast carrier 76, it pivots the toast carrier to a horizontal position as shown in Fig. 5. This causes the head 224 of the plunger 222 to engage the side of the retainer 198 near the bottom thereof, and thus to pivot the retainer away from the blade 184 for releasing the tongue 192 so that the blade 184 drops under the force of the spring 194 to bring the contact 188 into engagement with the contact 168. This completes a circuit through the field coils of the motor 92 in series with the oven comprising the heating elements 40 and the timer 259. Such energization of the motor causes the motor to run to lower the carriage by means of pinion 124 and rack 82.

Figure 6:
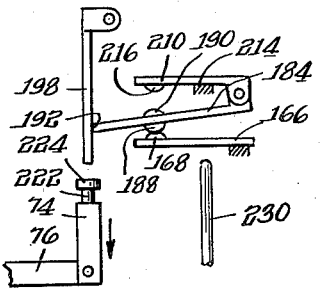

As the carriage is lowered, the plunger head 224 passes beyond the lower end of the retainer 198 as shown in Fig. 6. This allows the spring 206 to shift the retainer back toward its initial position into engagement with the end of the tongue 192 which stops the retainer just short of its initial position.

Figure 7:
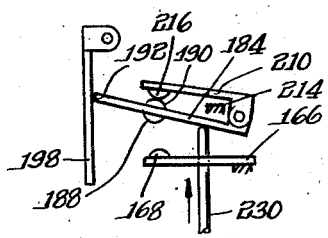
Figure 8:
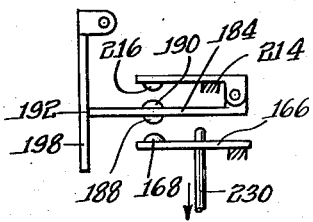

When the carriage reaches fully lowered position, the bottom of the tooth 140 engages the latch bar 130 and pivots the latch bar in a clockwise direction to engage the finger 138 above the tooth 140 to latch the carriage in lowered position. The clockwise pivoting of the latch bar moves the end 238 thereof upwardly and brings the enlarged bolt head 240 into engagement with the slide rod 230 to shift the same upwardly against the force of the spring 234. The slide bar 230 engages the blade 184 and moves this blade upwardly to open contacts 168, 188, and to close the contacts 190, 216 as shown in Fig. 7. Such opening of the first mentioned pair of contacts and closing of the second mentioned pair of contacts removes the motor 92 from the circuit (leaving the timer 259 in the circuit), and increases the energization of the oven toasting coils or heating elements 40. After a predetermined time the timing mechanism retracts the detent 146 to allow the latch bar 130 to pivot counterclockwise, thereby releasing the carriage to allow the carriage to rise under the action of spring 126, and simultaneously allowing the spring 234 to lower the slide rod 230 to allow the intermediate switch blade 184 to drop to the position shown in Fig. 8 with the tongue 192 supported in the grove 200. The toasting oven thus is de-energized, and the motor remains unenergized. The stop 214 limits downward movement of the blade 210 to retain this blade in its normal quiescent position.

Figure 9:
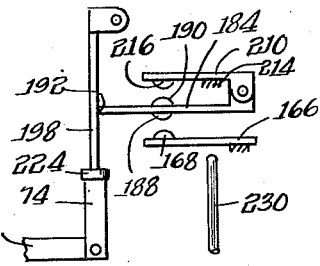

As the carriage reaches its fully raised position the head 224 of the plunger 222 engages beneath the retainer as shown in Fig. 9, and the plunger accordingly is depressed against the action of its biasing spring 228. When the toasted bread slice or slices are removed from the carrier 76, the spring 218 pivots the carriers 76 and the box-like bracket back into the position shown in Fig. 10. This is the initial or quiescent position, and the toaster now is ready for another toasting operation.

It now will be apparent that by using the motor and the timer in series with the heating elements, the heating elements are preheated without the provision of any extra apparatus. Furthermore, the motor operates on a lower voltage than with the conventional connections directly across the power line, and with the correspondingly higher current. As a result, wire of a larger diameter and of a lesser number of turns is used in the motor coils. In the motor size used for motor driven toasters this reduces the cost of the motor somewhat.

An oven and timer both wound with non-magnetic resistance wire may have a resistance of 11.5 ohms when cold. The oven represents approximately 11 ohms and the timer .5 ohm of this figure. The oven and timer resistance may rise about 10 and up to 12.7 ohms at operating temperature, drawing 1040 watts at 115 volts. The following table shows the approximate voltages across the motor and such an oven and timer for four different motors energized from a 115 volt line:

| Motor Impedance (power factor 52%) | Initial (cold) | | Equilibrium | | Watts to Oven and Timer |
|---|---|---|---|---|---|
| | Motor | Oven and Timer | Motor | Oven and Timer | |
| | Volts | Volts | Volts | Volts | |
| 3.1 ohms | 27 | 99 | 25 | 100 | 810 |
| 4.9 ohms | 39 | 89 | 37 | 91 | 670 |
| 7.8 ohms | 53 | 78 | 51 | 79 | 520 |
| 12.4 ohms | 68 | 63 | 67 | 65 | 355 |

Since the motor impedance is partially reactive the sum of the two voltages under any one condition exceeds the 115 volts of the supply. To keep the maximum rate of temperature rise at the lowest value, the maximum, which is the initial rate, should be the same for the two steps. If the wire of the heating elements of the oven and timer came to equilibrium on the first step, that substantial equality would be achieved in the foregoing example with the 7.8 ohms motor. However, the duration of the first step is the time required for lowering the toast carriage, which may be much less than the time required for reaching substantial equilibrium. For example, in one construction the lowering time, and therefore the duration of the pre-heating step is ¼ to ⅓ second whereas the time for the wire of the oven heating element to reach substantially equilibrium temperature is several seconds.

Accordingly in that instance it is desirable to use a motor of lower impedance so as to apply a higher wattage to the oven and timer during the first step, for example the 3.1 ohm motor in the examples shown in the table.

It will be apparent that the example herein shown and described is for illustrative purposes only. Various changes may be made in the structure and form a part of the invention insofar as they fall within the spirit and scope of the appended claims.

I claim:

1. In an automatic electric toaster the combination with heating means and a reciprocal bread carrier movable into toasting and non-toasting positions relative to said heating means, of spring means biasing the carrier in non-toasting position, electric-motor means for moving the carrier to toasting position, a control switch for energizing and de-energizing said motor means and said heating means comprising a pair of relatively-fixed contacts and a movable contact selectively engageable with either of said pair of relatively-fixed contacts or held in an intermediate position out of engagement with both of said contacts, means on said carrier operated by insertion of a bread slice for moving said movable contact into engagement with one of said fixed contacts to energize said motor means and said heating means in series, means for moving said movable contact from said one fixed contact into engagement with said other fixed contact to de-energize said motor means while continuing energization of said heating means at a higher voltage and operable in response to movement of the carrier to toasting position, timing means for releasing said carrier for return by said spring means to non-toasting position, and means operable upon such return to move said movable contact out of engagement with said other fixed contact into intermediate position out of engagement with both of said fixed contacts.

2. A toaster as set forth in claim 1 and further including switch means for connecting said timing means in series with the motor means and the heating means.

3. A toaster as set forth in claim 1 wherein the wattage of the heating means with the motor means in series is at least substantially 20% less than the wattage of the heating means energized at the higher voltage and with the motor means de-energized.

4. A toaster as set forth in claim 1 wherein the wattage of the heating means while preheating at reduced voltage with the motor in series is reduced between substantially 20% and 50% below the wattage of the heating means when energized at higher voltage with the motor means de-energized.

5. A power-operated toaster comprising a toasting oven, electric means for toasting bread in said oven, bread-carrying means, means for moving said carrying means between toasting and non-toasting positions, said moving means including electric-motor means for moving said carrying means to toasting position and spring means stressed thereby for returning said carrying means to non-toasting position, a latch for holding the carrying means in toasting position, a timer for releasing said latch, a pair of spaced-apart contacts, one of said contacts being connected to said motor means and the other of said contacts being connected to said electric-toasting means, said motor means and said toasting means also being electrically connected, a pair of electric input means, means connecting one of said input means to said toasting means, contact means movable between said spaced-apart contacts, means connecting the other of said input means to said movable contact means, means for maintaining said movable contact means at an intermediate open-switch position out of engagement with both of said spaced-apart contact means, means operated by a slice of bread in said oven and acting on said movable contact means for moving said movable contact means from said intermediate position into engagement with one of the pair of spaced-apart contacts to connect said electric-motor means and said electric-toasting means in series between said input means, means operable upon movement of said bread-carrying means to toasting position and acting on said movable contact means for moving said movable contact means out of engagement with said one of said contacts and through said open-switch position into engagement with the other of said pair of spaced-apart contacts to connect said electric-toasting means between said input means while disconnecting said electric-motor means, and means operable upon return of said bread-carrying means to non-toasting position for returning said movable contact means to said intermediate open-switch position at the end of a toasting operation.

6. A power-operated toaster as set forth in claim 5 wherein the timer is connected between the electric-toasting means and one of the input means whereby said timer is energized in series with said electric-toasting means.

References Cited in the file of this patent

UNITED STATES PATENTS

| 2,107,388 | Purpura | Feb. 8, 1938 |
| 2,182,124 | Guerra | Dec. 5, 1939 |
| 2,266,301 | Biebel | Dec. 16, 1941 |
| 2,288,699 | Gomersall | July 7, 1942 |
| 2,288,713 | Ireland | July 7, 1942 |
| 2,307,347 | Anderson | Jan. 5, 1943 |
| 2,347,385 | Wright et al. | Apr. 25, 1944 |
| 2,485,456 | Poole | Oct. 18, 1949 |
| 2,566,904 | Palmer | Sept. 4, 1951 |
| 2,581,975 | Snyder | Jan. 8, 1952 |
| 2,693,142 | Ireland | Nov. 2, 1954 |